United States Patent
Choi et al.

(10) Patent No.: US 10,573,892 B2
(45) Date of Patent: Feb. 25, 2020

(54) NEGATIVE ELECTRODE ACTIVE MATERIAL AND SECONDARY BATTERY INCLUDING THE SAME

(71) Applicant: LG CHEM, LTD., Seoul (KR)

(72) Inventors: Jung Hyun Choi, Daejeon (KR); Yong Ju Lee, Daejeon (KR); Eun Kyung Kim, Daejeon (KR); Hyun Chul Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 119 days.

(21) Appl. No.: 15/748,289

(22) PCT Filed: Oct. 17, 2016

(86) PCT No.: PCT/KR2016/011610
§ 371 (c)(1),
(2) Date: Jan. 29, 2018

(87) PCT Pub. No.: WO2017/065586
PCT Pub. Date: Apr. 20, 2017

(65) Prior Publication Data
US 2018/0219225 A1    Aug. 2, 2018

(30) Foreign Application Priority Data

Oct. 15, 2015 (KR) .................. 10-2015-0143861
Oct. 14, 2016 (KR) .................. 10-2016-0133663

(51) Int. Cl.
*H01M 4/02* (2006.01)
*H01M 4/587* (2010.01)
(Continued)

(52) U.S. Cl.
CPC ........... *H01M 4/587* (2013.01); *H01M 4/133* (2013.01); *H01M 4/134* (2013.01);
(Continued)

(58) Field of Classification Search
CPC ....................................................... H01M 4/02
See application file for complete search history.

(56) References Cited

U.S. PATENT DOCUMENTS

2007/0202403 A1    8/2007    Oh et al.
2008/0145761 A1    6/2008    Petrat et al.
(Continued)

FOREIGN PATENT DOCUMENTS

DE    10 2014 202 156 A1    8/2015
JP    2002-255529 A    9/2002
(Continued)

OTHER PUBLICATIONS

Boehm, H.P., et al, "Surface Oxides of Carbon," Angew. Chem. Internat. Edit., 1964, vol. 3, No. 10, pp. 669-677.
(Continued)

*Primary Examiner* — Jacob B Marks
(74) *Attorney, Agent, or Firm* — Birch, Stewart, Kolasch & Birch, LLP

(57) ABSTRACT

The present invention relates to a negative electrode active material and a secondary battery including the same, and specifically, provides a negative electrode active material particle including a core, which includes a carbon-based active material and an oxygen functional group, and a shell, which surrounds the core and includes a silicon-based active material.

18 Claims, 1 Drawing Sheet

(51) Int. Cl.
*H01M 4/133* (2010.01)
*H01M 4/134* (2010.01)
*H01M 4/1393* (2010.01)
*H01M 4/1395* (2010.01)
*H01M 4/36* (2006.01)
*H01M 4/38* (2006.01)
*H01M 4/62* (2006.01)
*H01M 10/052* (2010.01)

(52) U.S. Cl.
CPC ....... *H01M 4/1393* (2013.01); *H01M 4/1395* (2013.01); *H01M 4/364* (2013.01); *H01M 4/366* (2013.01); *H01M 4/386* (2013.01); *H01M 4/625* (2013.01); *H01M 10/052* (2013.01); *H01M 4/622* (2013.01); *H01M 2220/20* (2013.01); *Y02E 60/122* (2013.01)

(56) References Cited

U.S. PATENT DOCUMENTS

| | | | |
|---|---|---|---|
| 2009/0038681 A1* | 2/2009 | Trancik | H01G 9/2022 136/256 |
| 2009/0297945 A1 | 12/2009 | Hwang et al. | |
| 2011/0309310 A1 | 12/2011 | Koller et al. | |
| 2012/0264020 A1 | 10/2012 | Burton et al. | |
| 2012/0282527 A1 | 11/2012 | Amine et al. | |
| 2014/0093773 A1 | 4/2014 | Hashimoto et al. | |
| 2014/0154564 A1 | 6/2014 | Yoo et al. | |
| 2015/0004488 A1 | 1/2015 | Abdelsalam et al. | |
| 2015/0044571 A1 | 2/2015 | Abdelsalam et al. | |
| 2015/0303460 A1 | 10/2015 | Murata et al. | |
| 2016/0365567 A1 | 12/2016 | Troegel et al. | |

FOREIGN PATENT DOCUMENTS

| | | |
|---|---|---|
| JP | 2008-532912 A | 8/2008 |
| JP | 2009-507338 A | 2/2009 |
| JP | 2015-508934 A | 3/2015 |
| KR | 10-2007-0027438 A | 3/2007 |
| KR | 10-2007-0111521 A | 11/2007 |
| KR | 10-0994181 B1 | 11/2010 |
| KR | 10-2011-0100209 A | 9/2011 |
| KR | 10-2014-0070416 A | 6/2014 |
| WO | WO 2012/160822 A1 | 11/2012 |
| WO | WO 2014/080629 A1 | 5/2014 |

OTHER PUBLICATIONS

European Search Report for Appl. No. 16855803.9 dated Mar. 22, 2018.
International Search Report for PCT/KR2016/011610 dated Feb. 15, 2017.
Wu, Y.P., et al, "Modified natural graphite as anode material for lithium ion batteries," Journal of Power Sources, 2002, vol. 111, pp. 329-334.

* cited by examiner

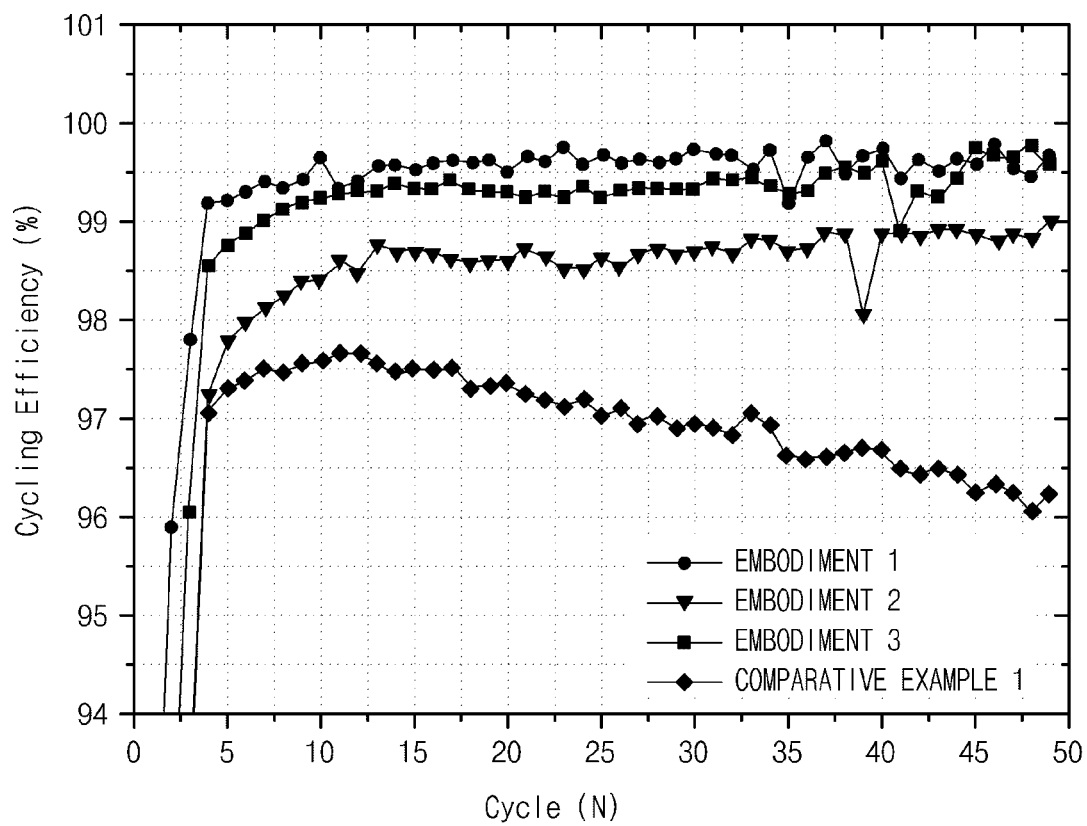

NEGATIVE ELECTRODE ACTIVE MATERIAL AND SECONDARY BATTERY INCLUDING THE SAME

CROSS-REFERENCE TO RELATED APPLICATION

This application claims priority to and the benefit of Korean Patent Application Nos. 10-2015-0143861 and 10-2016-0133663, filed on Oct. 15, 2015 and Oct. 14, 2016, the disclosures of which are incorporated herein by reference in their entirety.

TECHNICAL FIELD

The present invention relates to a negative electrode active material and a secondary battery including the same.

BACKGROUND ART

The demand for the use of alternative energy or clean energy has been increasing due to a rapid increase in the use of fossil fuels, and the power generation and accumulation fields using electrochemical reactions are the currently most actively researched fields as a part thereof.

A secondary battery is a current representative example of electrochemical devices using electrochemical energy. Also, an application area thereof has gradually been increasing. Recently, as technical development and the demand for portable devices such as a portable computer, a cellular phone, a camera, and the like have been increasing, the demand for a secondary battery as an energy source has been rapidly increasing. Much research for a lithium secondary battery that provides high energy density and operation potential and has a long cycle lifespan and a low self-discharge rate among secondary batteries has been performed such that secondary batteries have been commercialized and generally used.

Generally, a secondary battery includes a positive electrode, a negative electrode, and an electrolyte. Here, since lithium ions which come out of a positive electrode active material serve to transfer energy while shuttling between both of the electrodes by being intercalated into a negative electrode active material such as carbon particles in a first charge and being deintercalated therefrom in case of discharge, the secondary battery may be charged and discharged.

For example, a lithium secondary battery has a structure in which a lithium electrolyte is impregnated in an electrode assembly which includes a positive electrode including a lithium transition metal oxide as an electrode active material, a negative electrode including a carbon-based active material, and a porous separator. The positive electrode is manufactured by coating an aluminum foil with a positive electrode mixture including the lithium transition metal oxide, and the negative electrode is manufactured by coating a copper foil with a negative electrode mixture including the carbon-based active material.

Among silicon-based materials which have recently been researched as high-capacity materials, a silicon-carbon composite active material is an active material formed by disposing a silicon-based material on a surface of a carbon-based negative electrode active material and has excellent discharge efficiency (80%) with a higher capacity than a theoretical capacity (372 mAh/g) of carbon-based negative electrode active materials such that it is expected to gain popularity as a high-capacity secondary battery material.

However, due to weak binding forces between interfaces of carbon and silicon, a phenomenon in which an outermost silicon layer falls off of the carbon occurs during an electrode manufacturing process. Since the phenomenon reduces conductivity of the silicon and increases an irreversible capacity thereof, a capacity and efficiency thereof are reduced.

Accordingly, it is necessary to develop a negative electrode active material capable of providing excellent conductivity while increasing binding forces between carbon and silicon.

PRIOR ART DOCUMENT

Patent Document (Patent Document 1) Korean Patent Publication No. 10-2011-0100209

DISCLOSURE OF INVENTION

Technical Problem

It is a first technical aspect of the present invention to provide a negative electrode active material particle having high conductivity and a low irreversible capacity by modifying a surface of a carbon-based active material with an oxygen functional group and attaching the carbon-based active material to a silicon-based active material by using an electrostatic attraction between the oxygen functional group and the silicon-based active material.

It is a second technical aspect of the present invention to provide a secondary battery, a battery module, and a battery pack which include the negative electrode active material particle.

Technical Solution

According to one aspect of the present invention, there is provided a negative electrode active material particle including a core, which includes a carbon-based active material and an oxygen functional group, and a shell, which surrounds the core and includes a silicon-based active material.

According to another embodiment of the present invention, there are provided a secondary battery including a negative electrode to which a negative electrode mixture including the negative electrode active material particle is applied, a positive electrode, and an electrolyte, a battery module, and a battery pack.

Advantageous Effects

According to embodiments of the present invention, a negative electrode active material particle includes an oxygen functional group such that a silicon-based active material is attached to a surface of a carbon-based active material. Since the oxygen functional group is negatively charged due to oxygen having high electronegativity, the oxygen functional group attracts silicon atoms of the silicon-based active material, which are positively charged, by using an electrostatic attraction such that the silicon-based active material and the carbon-based active material are strongly bonded to each other. Additionally, when the oxygen functional group is bound to 2.0 to 4.0% of all sites of an outermost carbon atom to which the oxygen functional group can be covalently bound on a surface of the carbon-based active material, a decrease in conductivity of the negative electrode active material particle due to the oxygen functional group may be prevented.

BRIEF DESCRIPTION OF DRAWINGS

FIG. 1 is a graph illustrating cycling efficiency of Embodiments 1 to 3 of the present specification and Comparative Example 1.

BEST MODE FOR INVENTION

Hereinafter, the present invention will be described in detail for understanding the present invention.

The terms used in the specification and the claims are not limited to a general or lexical meaning and should be understood as having meanings and concepts adequate for the technical concept of the present invention based on the principle that the inventor can adequately define the meanings of the terms to describe the present invention of the inventor in the best way.

The terms used herein are used only to describe the exemplary embodiments and are not intended to limit the present invention. Singular forms, unless defined otherwise in context, include plural forms.

Throughout the specification, it should be understood that the terms "comprise," "have," and the like are used herein to specify the presence of implemented features, numbers, steps, elements, or combinations thereof but do not preclude the presence or addition of one or more other features, numbers, steps, elements, or combinations thereof.

According to one embodiment of the present invention, there is provided a negative electrode active material particle including a core, which includes a carbon-based active material and an oxygen functional group, and a shell which surrounds the core and includes a silicon-based active material.

The carbon-based active material may have a spherical shape and a mean diameter $D_{50}$ of 5.0 μm to 20.0 μm. One or more selected from a group consisting of natural graphite, artificial graphite, hard carbon, and soft carbon may be used as the carbon-based active material. In detail, when spherical natural graphite is used as the carbon-based active material, an effect of easily distributing silicon to a surface of the graphite may be provided.

The oxygen functional group may be covalently bound to an outermost carbon atom of the carbon-based active material. Since the oxygen functional group has a negative charge due to oxygen with high electronegativity and has an electrostatic attraction with a silicon atom of the silicon-based active material, which has a positive charge, the carbon-based active material and the silicon-based active material may accordingly be provide with an excellent bonding force due to the oxygen functional group.

Here, the oxygen functional group may be bound to about 2.0 to 4.0% of all sites of the outermost carbon atom of the carbon-based active material to which the oxygen functional group is covalently bondable. When the oxygen functional group is bound at a rate less than 2.0%, due to a smaller amount of the oxygen functional group providing the electrostatic attraction with the silicon-based active material, there is a problem in that the bonding force between the carbon-based active material and the silicon-based active material is not sufficient. When the oxygen functional group is bound at a rate more than 4.0%, conductivity of an active material is decreased.

The rate indicating a degree of connection between the oxygen functional group and the surface of the carbon-based active material may be quantitatively measured by using X-ray photoelectron spectroscopy or an element analyzer. In detail, oxygen content of the surface of the carbon-based active material may be derived by X-ray photoelectron spectroscopy. In the specification, a binding rate of the oxygen functional group to all sites to which the oxygen functional group is covalently bound to the outermost carbon atom of the carbon-based active material corresponds to the oxygen content measured by the X-ray photoelectron spectroscopy. Binding the oxygen functional group to the surface of the carbon-based active material at the above-described rate may be performed by emitting ultraviolet rays having a wavelength of 184.9 to 253.7 nm and intensity of 0.02 to 0.05 W/cm$^2$ at a distance of 5 to 130 mm from the surface of the carbon-based active material under a normal pressure ozone condition for 2 to 7 hours. Here, the normal pressure refers to a pressure of 1 atmosphere similar to atmospheric pressure.

The oxygen functional group may be one or more of a hydrophilic group and a hydrophobic group. Particularly, when the hydrophilic group and the hydrophobic group are both included, an effect of reducing the occurrence of HF caused by a reaction to an electrolyte is provided.

The hydrophilic group may be one or more of a hydroxyl group and a carboxyl group, and the hydrophobic group may be one or more of an ether group and a carbonyl group. However, the oxygen functional group is not limited thereto.

The shell including the silicon-based active material may have a shape which surrounds at least a part of the core, in detail, a shape which surrounds an entire surface of the core, and may have a uniform thickness. The thickness of the shell may be 0.02 μm to 0.1 μm. When the thickness of the shell is less than 0.02 μm, a problem in that a capacity of the negative electrode active material is not sufficiently increased may occur. When the thickness of the shell is greater than 0.1 μm, a problem in that adhesion with the silicon-based active material is decreased may occur.

As the silicon-based active material, one or more selected from a group consisting of a crystalline silicon-based active material, an amorphous silicon-based active material, silicon oxide ($SiO_x$, 0<x<2), and a silicon-based active material coated with an oxide layer may be used. In detail, when amorphous silicon is used, higher electrostatic attraction with the oxygen functional group of the carbon-based active material may be provided. However, the silicon-based active material is not limited thereto.

The negative electrode active material particle may further include a coating layer which surrounds the shell and includes one or more of a carbon-based material and a polymer. The carbon-based material and the polymer may allow conductivity of the negative electrode active material to be more improved, suppress volume expansion of the negative electrode active material, and reduce a reaction thereof with an electrolyte.

Here, amorphous carbon may be used as the carbon-based material, a conductive polymer may be used as the polymer, and the coating layer may have a thickness 0.02 μm to 0.1 μm. In addition, the coating layer may be included 1 wt % to 50 wt % of the whole weight of negative electrode active material particles. When the coating layer is included less than 1 wt % of the weight thereof, there is a problem in that volume expansion suppression and conductivity improvement effects are not sufficient. When the coating layer is included more than 50 wt % of the weight thereof, there is a problem in that a deincalaration of lithium ions is difficult.

According to one embodiment of the present invention, there is provided a method of manufacturing negative electrode active material particles, which includes an operation of ultraviolet-ozone-treating a carbon-based active material (Operation 1) and an operation of forming a silicon-based active material shell on the ultraviolet-ozone-treated carbon-based active material (Operation 2).

In Operation 1, a carbon-based active material is ultraviolet-ozone treated to oxidize a surface of the carbon-based active material such that the surface of the carbon-based active material is modified into an oxygen functional group.

Here, the ultraviolet-ozone treatment may be performed under a condition in which ultraviolet rays having a wavelength of 150 to 270 nm and an intensity of 0.01 to 0.08 W/cm$^2$ are emitted at a distance of 1 to 150 mm from the carbon-based active material under a normal pressure ozone condition. When the ultraviolet-ozone treatment is performed under the above condition, excellent adhesion with a silicon-based active material may be provided and conductivity of active materials may be maintained. Here, the normal pressure refers to a pressure of 1 atmosphere similar to atmospheric pressure.

In detail, in the ultraviolet-ozone-treatment condition, ultraviolet rays having a wavelength of 184.9 to 253.7 nm and an intensity of 0.02 to 0.05 W/cm$^2$ are emitted at a distance of 5 to 130 mm from the carbon-based active material under the normal pressure ozone condition for 2 to 7 hours. The oxygen functional group may be bound to about 2.0 to 4.0% of all sites to which the oxygen functional group is covalently bound at an outermost carbon atom of the carbon-based active material.

In Operation 2, a silicon-based active material shell is formed on the ultraviolet-ozone treated carbon-based active material. A silicon-based active material coating layer in the operation 2 may be formed by a chemical vapor-deposition method using one or more types of steam selected from a group consisting of silane, trichlorosilane, and chlorosilance.

According to one embodiment of the present invention, there is provided a secondary battery including a negative electrode to which a negative electrode mixture including the negative electrode active material particles is applied, a positive electrode, and an electrolyte.

The secondary battery according the embodiment of the present invention includes the negative electrode active material particles. Since the negative electrode active material particles have excellent adhesion between a carbon-based active material and a silicon-based active material due to an electrostatic attraction between an oxygen functional group connected to the carbon-based active material and the silicon-based active material, a negative electrode with high capacity and high density may be manufactured and a secondary battery including the negative electrode may provide a high cycle characteristic.

A positive electrode according to the embodiment of the present invention may be manufactured, for example, by applying a positive electrode mixture formed by mixing a positive electrode active material particle, a conductive material, a binder, a filler, and a solvent such as N-Methyl-2-pyrrolidone (NMP) and the like to a positive electrode current collector and drying and rolling the positive electrode current collector. A negative electrode may be manufactured by applying slurry formed by mixing a negative electrode mixture including the negative electrode active material particles according to the embodiment of the present invention with an organic solvent to a negative electrode current collector and drying and rolling the negative electrode current collector.

The positive electrode active material is not particularly limited, and, in detail, may be lithium transition metal oxide. As the lithium transition metal oxide, there are, for example, a Li—Co-based composite oxide such as LiCoO$_2$ and the like, Li—Ni-a Co—Mn-based composite oxide such as LiNi$_x$Co$_y$Mn$_z$O$_2$ and the like, a Li—Ni-based composite oxide such as LiNiO$_2$ and the like, a Li—Mn-based composite oxide such as LiMn$_2$O$_4$ and the like, and the like. One of the composite oxides or a plurality thereof may be used as the positive electrode material.

The conductive material is not particularly limited as long as the conductive material has conductivity without causing a chemical change of a corresponding battery. For example, conductive materials such as graphite, carbon black such as acetylene black, Ketjen black, channel black, furnace black, lamp black, thermal black, and the like, a conductive fiber such as a carbon fiber, a metal fiber, and the like, fluorocarbon, aluminum, a metal powder such as a nickel power and the like, conductive whiskers such as titanic acid and the like, polyphenylene derivatives, and the like may be used.

The positive electrode or the negative electrode may have forms in which the positive electrode mixture or the negative electrode mixture is applied to a current collector. The current collector is not particularly limited as long as the current collector has conductivity without causing a chemical change of a corresponding battery. For example, copper, stainless steel, aluminum, nickel, titanium, calcined carbon, aluminum or stainless steel whose surface is treated with carbon, nickel, titanium, silver, and the like may be used.

The electrolyte may include a non-aqueous organic solvent and a metallic salt.

As the non-aqueous organic solvent, for example, an aprotic organic solvent such as N-Methyl-2-pyrrolidone, propylene carbonate, ethylene carbonate, butylene carbonate, dimethyl carbonate, diethyl carbonate, gamma-butyrolactone, 1,2-dimethoxyethane, tetrahydroxy franc, 2-methyl tetrahydrofuran, dimethly sulfoxide, 1,3-dioxolane, formamide, dimethylformamide, dioxolane acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propinate, ethyl propionate, and the like may be used.

The metallic salt may be a lithium salt. The lithium salt is a material well soluble in a non-aqueous electrolyte. For example, LiCl, LiBr, LiI, LiClO$_4$, LiBF$_4$, LiB$_{10}$Cl$_{10}$, LiPF$_6$, KiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, aliphatic lower lithium carbonate, 4-phenyl lithium borate, imide, and the like may be used as the lithium salt.

According to another embodiment of the present invention, there are provided a battery module including a secondary battery as a unit cell and a battery pack including a battery module. Since the battery module and the battery pack include the secondary battery having a high cycle characteristic, the battery module and the battery pack may be used as power sources of one or more medium-large devices such as a power tool, an electric car including an electric vehicle (EV), a hybrid electric vehicle (HEV), and a plug-in HEV (PHEV), and a power storage system.

Hereinafter, embodiments of the present invention will be described in detail to allow one of ordinary skill in the art to implement the present invention. However, the present invention may be embodied in several various forms and is not limited to the embodiments described herein.

Embodiment 1

Operation 1: Introduction of Oxygen Functional Group to Surface of Carbon-Based Active Material A carbon-based active material with an oxygen functional group of —COOH or —OH bound thereto was manufactured by putting 5.0 g of spherical natural graphite having a mean diameter $D_{50}$ of 15 μm into an ultraviolet-ozone washer and emitting infrared rays having a wavelength of 185 nm and intensity of 0.02 W/cm$^2$ at a temperature of 25° C. with a pressure of 1 atmosphere under an ozone condition blocked from water at a normal pressure at a distance of 130 mm for 3 hours.

Operation 2: Manufacture of Silicon-Based Active Material Shell

A shell coated with amorphous silicon having a thickness of 30 nm was manufactured by putting the spherical natural graphite with the oxygen functional group bound thereto, which was manufactured in Operation 1, into a chemical vapor deposition (CVD) chamber, supplying silane gas thereto, and heating the chamber at 460° C.

Operation 3: Manufacture of Carbon Coating Layer

Finally, a negative electrode active material was manufactured by coating the spherical natural graphite coated having the amorphous silicon with amorphous carbon at 900° C. using an acetylene gas. Here, carbon content thereof was checked by thermogravimetric analysis (TGA) equipment, and the carbon content was 5 wt % of an overall weight of the negative electrode active material.

Operation 4: Manufacture of Secondary Battery

A negative electrode mixture was manufactured by mixing the negative electrode active material particle, carbon black, which is a conductive material, carboxylmethyl cellulose (CMC), which is a binder, and styrene butadiene rubber (SBR) at a weight ratio of 95.8:1.7:1.5. The negative electrode was manufactured by applying the negative electrode mixture to a copper current collector, drying the copper current collector with the negative electrode mixture at a temperature of 130° C. in a vacuum oven, and rolling the dried copper current collector. A lithium coin half-cell was manufactured by interposing a porous polyethylene separator between the negative electrode and a counter electrode using Li metal, dissolving 0.5 wt % of vinylene carbonate in a mixture solution in which methylethylcarbonate (EMC) and ethylene carbonate (EC) were mixed at a volume mixing ratio of 7:3, and injecting an electrolyte in which LiPF$_6$ was dissolved at a concentration of 1 M.

Embodiment 2

A secondary battery was manufactured similarly to Embodiment 1 except for ozone being emitted in the ultraviolet-ozone washer for one hour instead of 3 hours in Operation 1 of Embodiment 1.

Embodiment 3

A secondary battery was manufactured similarly to Embodiment 1 except for ozone being emitted in the ultraviolet-ozone washer for 8 hours instead of 3 hours in Operation 1 of Embodiment 1.

<Comparative Embodiment 1> Manufacture of Negative Electrode Active Material Particles Without an Oxygen Functional Group A secondary battery was manufactured by performing operations similar to Embodiment 1 except for the fact that an oxygen functional group was not introduced in Operation 1 of Embodiment 1.

Experimental Example 1

Oxygen contents of the carbon-based active materials manufactured in Operations 1 of Embodiments 1 to 3 and Comparative Example 1 were measured by X-ray photoelectron spectroscopy, and results thereof are shown in Table 1.

TABLE 1

|  | Oxygen content (%) |
| --- | --- |
| Embodiment 1 | 2.32 |
| Embodiment 2 | 1.04 |
| Embodiment 3 | 5.30 |
| Comparative Example 1 | 0.05 |

As shown in Table 1, since the oxygen content in Embodiment 1 is about 45 times higher than that of Comparative Example 1, it can be confirmed that an oxygen functional group including oxygen was formed on the surface of the carbon-based active material by the ultraviolet-ozone treatment of Operation 1 of Embodiment 1. Also, since the oxygen content in Embodiment 1 in which ozone emission time was 3 hours, which satisfies a condition of 2 to 7 hours, the oxygen content was 2.32%. On the other hand, it may be seen that the oxygen contents of Embodiments 2 and 3, which do not satisfy the ozone emission time of 2 to 7 hours, were 1.04%, which is less than Embodiment 1, and 5.30%, which is more than Embodiment 1.

Experimental Example 2

Capacity Characteristic

The secondary batteries manufactured in Embodiment 1 and Comparative Example 1 were evaluated as follows, and results thereof are shown in the following Table 2.

Method of Evaluating Charge and Discharge

Charge constant current (CC)/constant value (CV) (5 mV/0.005 C current cut-off) condition Discharge CC condition 1.5V Charge and discharge of a battery were performed with 0.1 C for the first two cycles and performed with 0.5 C for the third to 49th cycles. The charge and discharge were completed after 50 cycles of charge (in which lithium is in a negative electrode), the battery was dissembled to measure a thickness thereof, and an electrode thickness charge rate was calculated. In addition, cycling efficiency was measured using a discharged capacity compared to a charged capacity per cycle, and is shown in FIG. 1.

TABLE 2

|  | Discharge Capacity [mAh/g] | Initial Efficiency [%] | Capacity Maintenance Rate (%) (49th Discharge Capacity/First Discharge Capacity × 100) | Electrode Thickness Change Rate (%) (Thickness Change/Initial Thickness) (50th charge) |
|---|---|---|---|---|
| Embodiment 1 | 514 | 91 | 84 | 90 |
| Embodiment 2 | 506 | 86 | 60 | 105 |
| Embodiment 3 | 505 | 87 | 75 | 110 |
| Comparative Example 1 | 503 | 85 | 51 | 149 |

As shown in Table 2, it can be seen that the capacity maintenance rates and electrode thickness change rates were improved in Embodiments 1 to 3 in comparison to Comparative Example 1.

In detail, the initial efficiencies of Embodiments 1 to 3 were higher than that of Comparative Example 1. Also, Embodiment 1 with the oxygen content of 2.32%, which satisfied 2 to 4%, had a higher initial efficiency than Embodiments 2 to 3, which did not satisfy the range.

Through this, it may be seen that, since the secondary battery of Embodiment 1 increases binding forces of a silicon-graphite composite by allowing the oxygen functional group on an interface of the silicon-graphite composite to exist, a lifespan characteristic thereof was improved and the electrode thickness change rate thereof may also be reduced in comparison to the secondary battery of Comparative Example 1.

When cycling efficiency was compared with reference to FIG. 1, it may be seen that a cycle characteristic of Comparative Example 1 was worse than those of Embodiments 1 to 3. Also, Embodiment 2 with the oxygen content less than 2% had a cycle characteristic slightly worse than that of Embodiment 1. In addition, it may be seen that Embodiment 3 with the oxygen content higher than 4% had lower efficiency than that of Embodiment 1 in most cycles.

Although the exemplary embodiments of the present invention have been described above, the scope of the present invention is not limited thereto and further includes a variety of changes and modified forms conceivable by those skilled in the art using a fundamental concept of the present invention defined in the following claims.

The invention claimed is:

1. A negative electrode active material particle comprising a core, which comprises a carbon-based active material and an oxygen functional group, and a shell which surrounds the core and comprises a silicon-based active material.

2. The negative electrode active material particle of claim 1, wherein the oxygen functional group comprises one or more of a hydrophilic group and a hydrophobic group.

3. The negative electrode active material particle of claim 2, wherein the hydrophilic group comprises one or more of a hydroxyl group and a carboxyl group, and the hydrophobic group comprises one or more of an ether group and a carbonyl group.

4. The negative electrode active material particle of claim 1, wherein the oxygen functional group is covalently bound to an outermost carbon atom of the carbon-based active material.

5. The negative electrode active material particle of claim 1, wherein the oxygen functional group is bound to about 2.0 to 4.0% of all sites of an outermost carbon atom of the carbon-based active material at which the oxygen functional group is covalently bondable.

6. The negative electrode active material particles of claim 1, further comprising a coating layer which surrounds the shell and comprises one or more of a carbon-based material and a polymer.

7. The negative electrode active material particle of claim 6, wherein the carbon-based material comprise amorphous carbon, and the polymer comprises a conductive polymer.

8. The negative electrode active material particle of claim 6, wherein the coating layer is 1 to 50 wt % of an overall weight of the negative electrode active material particle.

9. The negative electrode active material particle of claim 1, wherein the carbon-based active material comprises one or more selected from a group consisting of natural graphite, synthetic graphite, hard carbon, and soft carbon.

10. The negative electrode active material particle of claim 1, wherein a thickness of the shell is about 0.02 μm to 0.1 μm.

11. A method of manufacturing a negative electrode active material particle of claim 1, comprising:
    ultraviolet-ozone treating the carbon-based active material (Operation 1); and
    forming a silicon-based active material shell on the ultraviolet-ozone-treated carbon-based active material (Operation 2).

12. The method of claim 11, wherein the ultraviolet-ozone treatment is performed by emitting infrared rays having a wavelength of 150 to 270 nm and an intensity of 0.01 to 0.08 W/cm$^2$ at a distance of 1 to 150 mm under an ozone condition.

13. The method of claim 11, wherein a condition of the ultraviolet-ozone treatment is performed by emitting infrared rays having a wavelength of 184.9 to 253.7 nm and an intensity of 0.02 to 0.05 W/cm$^2$ at a distance of 5 to 130 mm under an ozone condition for about 2 to 7 hours.

14. The method of claim 11, wherein the silicon-based active material shell in Operation 2 is formed by a chemical vapor deposition (CVD) method using one or more types of steam selected from a group consisting of silane, trichlorosilane, and chlorosilane.

15. A secondary battery comprising a negative electrode to which a negative electrode mixture comprising the negative electrode active material particle of claim 1 is applied, a positive electrode, and an electrolyte.

16. A battery module comprising the secondary battery of claim 15 as a unit cell thereof.

17. A battery pack comprising the battery module of claim 16 and used as a power source of a medium-large device.

18. The battery pack of claim 17, wherein the medium-large device is one selected from a group consisting of an electric vehicle, a hybrid electric vehicle, a plug-in hybrid electric vehicle, and a power storage system.

* * * * *